United States Patent [19]

West

[11] Patent Number: 4,807,797
[45] Date of Patent: Feb. 28, 1989

[54] METHOD AND APPARATUS FOR WELDING HOLLOW ELONGATED BEAMS

[75] Inventor: John D. West, Manitowoc, Wis.

[73] Assignee: The Manitowoc Company, Inc., Manitowoc, Wis.

[21] Appl. No.: 623,614

[22] Filed: Jun. 21, 1984

Related U.S. Application Data

[63] Continuation of Ser. No. 538,355, Oct. 3, 1983, abandoned, which is a continuation of Ser. No. 211,525, Dec. 1, 1980, abandoned.

[51] Int. Cl.$^4$ .................................................. B23K 9/00
[52] U.S. Cl. ..................................... 228/175; 228/4.1
[58] Field of Search ............... 228/4.1, 5.1, 6 R, 175, 228/182, 212, 50

[56] References Cited

U.S. PATENT DOCUMENTS

| | | | |
|---|---|---|---|
| 3,164,713 | 1/1965 | Banks et al. | 228/6 X |
| 3,420,032 | 1/1969 | Felt | 228/136 X |
| 3,443,732 | 5/1969 | Wall, Jr. et al. | 228/7 |
| 3,694,990 | 10/1972 | Pamen | 29/155 R |
| 3,779,444 | 12/1973 | Kensrue | 228/4.1 |
| 3,780,420 | 12/1973 | Ohta | 228/212 X |
| 3,840,719 | 10/1974 | Cobbe | 228/4.1 X |
| 3,970,232 | 7/1976 | Meiton | 228/7 |
| 4,041,270 | 8/1977 | Akahide | 219/73 R |

FOREIGN PATENT DOCUMENTS

| | | | |
|---|---|---|---|
| 50-21424 | 7/1975 | Japan | 29/155 |
| 50-35487 | 11/1975 | Japan | 29/155 |
| 556208 | 11/1974 | Switzerland | 228/50 |

*Primary Examiner*—M. Jordan
*Attorney, Agent, or Firm*—Leydig, Voit & Mayer

[57] ABSTRACT

A method and apparatus for welding hollow elongated beams wherein the plates forming the beam are tack-welded together in proper relationship and all corners of the beam are simultaneously and continuously welded by moving a multiple head welding carriage along the length of the beam in order to minimize warpage and longitudinal deflection of the beam due to the welding heat.

2 Claims, 1 Drawing Sheet

U.S. Patent
Feb. 28, 1989
4,807,797
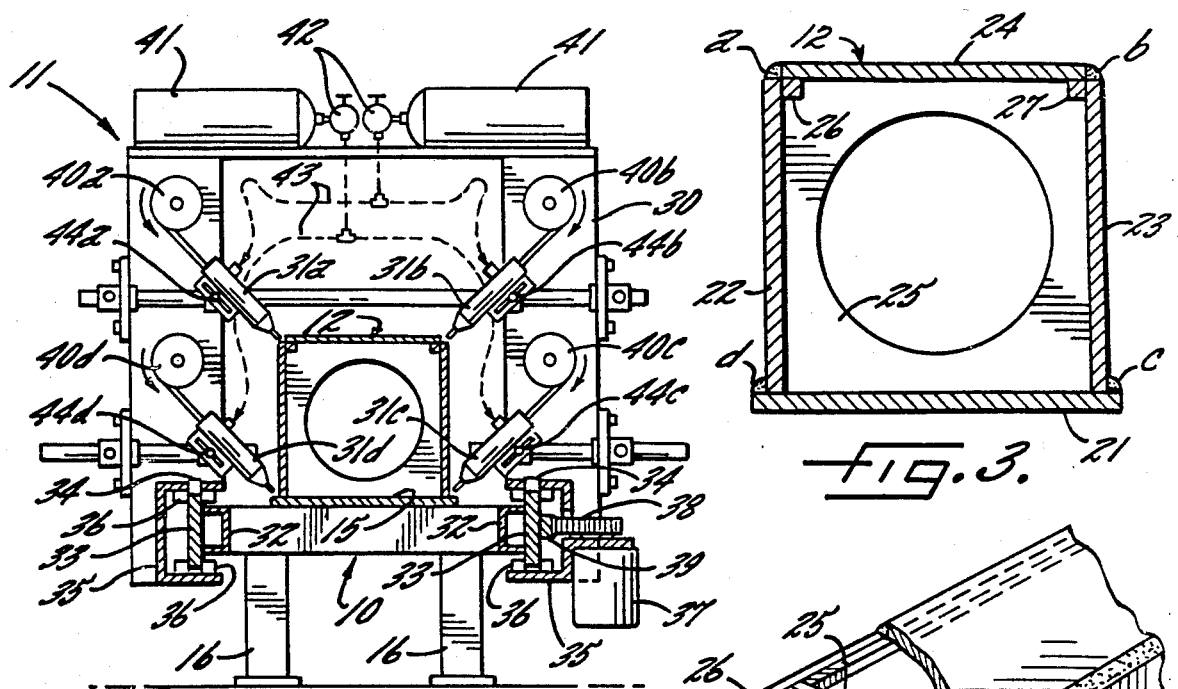
Fig. 1.
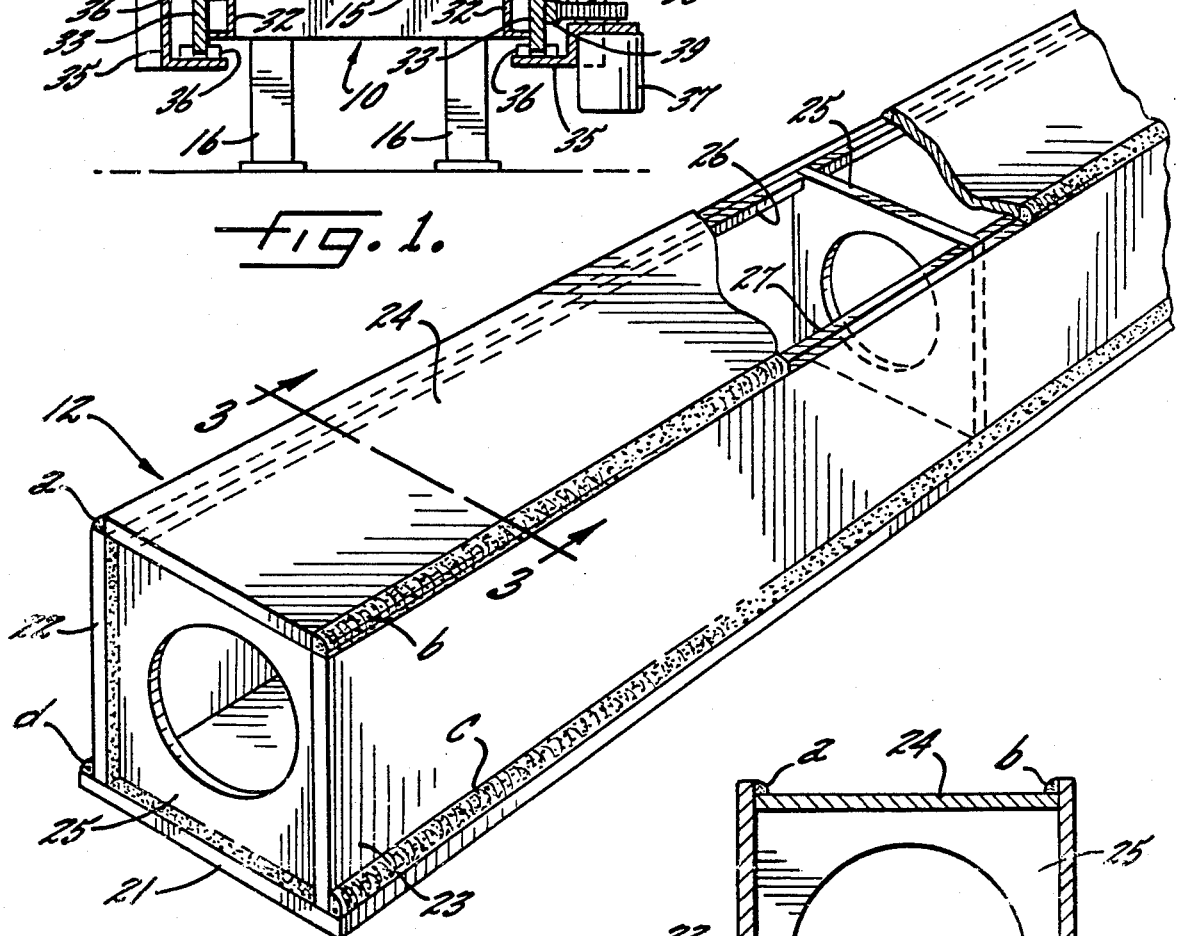
Fig. 2.
Fig. 3.
Fig. 4.

ically concerns a method of welding hollow elongated
METHOD AND APPARATUS FOR WELDING HOLLOW ELONGATED BEAMS This application is a continuation of application Ser. No. 538,355, filed Oct. 3, 1983, abandoned, which is a continuation of Ser. No. 211,525, filed Dec. 1, 1980, abandoned.

BACKGROUND OF THE INVENTION

The present invention relates generally to the fabrication of lightweight structural elements and more particularly concerns a method of welding hollow elongated beams.

In the fabrication of large load supporting and lifting devices such as heavy duty cranes and the like, it is desirable to utilize components which have high strength to weight ratios. Generally, these requirements are best met by hollow tubular members of substantial depth and width relative to their wall thickness. The fabrication of large elements of the foregoing nature, in the past has been both difficult and costly. Hollow steel members of substantial cross-section cannot be directly formed at steel rolling mills except with the installation of very expensive equipment which must be altered for each different cross-section to be formed. This makes the per unit cost of such hollow members essentially prohibitive.

Post forming of large size hollow elongated members such as by welding also has been generally unacceptable due to warpage and deflections induced or created during fabrication of the members. The prior art has, of course, recognized some of the problems which occur during welding beams, frames and other structural elements and certain solutions to these problems have been suggested. Nilsson et al. U.S. Pat. No. 3,199,174, for example, suggests uniformly heating the web of an I-beam while the flanges are welded to the web to prevent cross-sectional sagging of the web during cooling. Seedorff et al. U.S. Pat. No. 3,516,147 teaches simultaneously spot-welding the corners of a lightweight metal frame to insure cross-sectional accuracy. Yancey U.S. Pat. No. 3,882,654 teaches the use of an angle reinforcing bar welded into the corner of two abutted plates to prevent welding "blow-through" and to reduce stress concentrations at the corner. However, none of these references deal with the problem of longitudinal warpage and deflection of hollow elongated beams during fabrication by welding.

SUMMARY OF THE INVENTION

Accordingly, it is the primary aim of the present invention to provide a novel method and apparatus for welding hollow elongated structural elements without warpage or deflection resulting from localized or asymetrical heating. More particularly, the welding technique of this invention provides for simultaneously and continuously welding all of the corners of the hollow elongated beam members. Generally, the relatively thin strips of metal which are to form the top, sides and bottom of the beam are first accurately positioned with respect to one another and then tack-welded together. A welding apparatus with multiple welding heads—one at each corner of the beam—is moved along the beam so as to continuously and simultaneously weld all of the beam corners. This substantially equalizes the heat applied along each of the beam corners and prevents distortion of the plates and warpage of the beam which would otherwise occur.

These and other objects and advantages of the present invention will become apparent upon reading the following detailed description and upon reference to the attached drawings in which:

BRIEF DESCRIPTION OF THE DRAWINGS

FIG. 1 is a somewhat simplified end view, with certain portions in section, of the method and apparatus for simultaneously welding the corners of hollow elongated beams of the present invention;

FIG. 2 is an enlarged perspective view, with portions broken away for clarity, of the hollow elongated beam welded by the method and apparatus illustrated in FIG. 1;

FIG. 3 is a cross-section of the beam substantially as seen along line 3—3 in FIG. 2; and, FIG. 4 is a cross-section, similar to FIG. 3, of an alternative embodiment of the welded beam.

While the invention will be described and illustrated in connection with certain preferred embodiments and procedures, it should be understood that there is no intention to limit the invention to such specific embodiments and procedures. Rather, it is intended to cover all alternatives, modifications and equivalents as may properly fall within the spirit and scope of the invention as defined in the appended claims.

DESCRIPTION OF THE PREFERRED EMBODIMENTS

Turning now to the drawings, there is shown in FIG. 1 an exemplary support fixture 10 and an automatic welding apparatus, generally indicated at 11, for carrying out the method of simultaneously welding the corners of a hollow elongated beam 12 of the present invention. As illustrated, the support fixture 10 includes a flat, generally planar, welding table or work surface 15 supported by legs 16 secured to the shop floor. It should be understood, however, that the work surface 15 of the support fixture 10 could be mounted directly on the shop floor with suitable leveling plates and anchor bolts (not shown).

Referring also to FIGS. 2 and 3, it will be seen that the exemplary beam 12 includes a bottom plate 21, side plates 22 and 23 and a top plate 24 welded at the corners designated a, b, c and d. In the embodiment shown here, the side plates 22 and 23 are abutted against the upper surface of the bottom plate 21 slightly inboard of the edges thereof and the top plate 24 is dimensioned to just span the distance between the side plates 22 and 23. To insure that the plates 21-24 are held square and in proper alignment with respect to each other, the plates may be initially tack-welded to light weight metal cross webs or diaphram elements 25 from which the center has been cut out to further reduce weight.

Additionally, the corners of the plates may be tack-welded at spaced intervals along their length to further assist in maintaining alignment of the plates. Further, small metal backing strips 26 and 27 are desirably tack-welded inside upper corners a and b to prevent "blow-through" during welding. It should also be understood that the tack-welding of the plates 21-24, diaphrams 25 and backing bars 26 and 27 may be done at a separate set-up location with the aid of appropriate jigs and clamping fixtures (not shown) to properly locate the components with respect to one another.

The size and length of the beam 12, of course, will depend on its intended use or application. One example of such a beam is made of ¼" high strength T1 plate and the beam has square inside dimensions of 8". Thus, in the embodiment shown in FIGS. 1-3, the side plates 22, 23 and top plate 24 are 8" wide and the bottom plate 21 is 9" wide. The diaphrams 25 can be cut from ⅛" plate and the backing members can be formed from 3/16" bar stock. If heavier plate is used, such as ⅜" or more, the top plate 24 can be dimensioned to partially overlap the upper edges of the side plates 22 and 23 and tack-welded directly thereto. In that event, the cross diaphrams 25 and backing bars 26 and 27 may be eliminated. The length of the beam can also vary from 15' to 30' or more as needed.

In FIG. 4 an alternate beam configuration 12a is shown. Assuming the same inside dimension and plate thickness as in the embodiment shown in FIGS. 1-3, the beam 12a would have a 9" wide bottom plate 21, an 8" wide top plate 24 and side plates 22, 23 that are 8½" wide. Because the sides extend above the top plate, the square backing members in the corners may be eliminated. It should further be appreciated that heavier plate such as ½" could be used and that the beam could have a different cross-section, e.g. 6" square, if desired.

In accordance with the present invention, the corners a, b, c and d of the beam 12 are continuously and simultaneously welded by the method and apparatus 11 shown in FIG. 1. To this end, the beam 12 with tack-welded panels is secured to the surface of the welding table 15 by suitable shims and clamps (not shown) to insure that the beam is level, straight and true. The welding apparatus 11 includes a movable frame or carriage 30 which carries a plurality of welding heads 31a, b, c and d, one for each corner of the beam, which simultaneously weld the corners a-d of the beam 12 as the carrier is moved longitudinally relative to the beam. By welding all four corners simultaneously, warpage and heat induced deflection of the beam 12 is substantially entirely eliminated. Thus, the fabricated beam 12 is straight, true and structurally strong.

To support the welding carriage 30, the support 10 includes a pair of side rails 32 having flanged tracks 33 which are engaged by vertical support rollers 34 journaled in guide brackets 35 secured to the welding frame 30. Preferrably, the guide brackets 35 also include a plurality of upper and lower side thrust rollers 36 to keep the carriage accurately centered on the tracks 33. The carriage 30 also carries a drive motor 37 which engages a pinion 38 in mesh with a rack 39 on one of the tracks 33 for propelling the welding carriage 30 along the length of the beam 12.

In the illustrative embodiment, the welding heads 31a-31d are of the shielded-arc type continuous wire feeder which are shown schematically at 40a-40d. Such wire feeders are known in the art, one example being model WC-50S manufactured by Chemtron Corporation. The welding wire may be on the order of 1 mm. in diameter and the welding arc is preferrably shielded by a protective gas such as a mixture of 75% Argon and 25% $CO_2$, or the like, supplied from tanks 41 through control valves 42 and suitable piping 43 to the welding heads 31a-31d.

The drive motor 37 is preferrably of the variable speed type so that the travel speed of the welding carriage 30 can be controlled, for example, on the order 12 to 16 in/min. Likewise, the welding heads 31a-31d are adjustably mounted as at 44a-44d on the carriage 30 so that both the angle and clearance of the welding arc at each corner of the beam 12 can be individually adjusted. Generally an angle between 30 degrees and 45 degrees is preferred. It will also be appreciated that each welding head 31a-31d is individually electrically controlled by suitable switches and circuit means (not shown). For welding of the type described herein an arc voltage on the order of 24-28 volts has been found to be satisfactory.

From the foregoing, it will be appreciated that the welding method and apparatus of the present invention is well suited for welding hollow elongated beams 12 while minimizing warpage and deflection in the beam. A finished beam 12 is illustrated in FIG. 2 with continuous open corner filet welds in the upper corners a and b and continuous regular filet welds at the lower corners c and d. In this embodiment, backing strips 26, 27 are tack-welded in the upper corners a and b to prevent "blow-through" of the open corner filet welds. Also cross webs or diaphrams 25 are utilized to initially locate and securely hold the plates 21-24 for the continuous welding operation. If desired, the corners of the diaphrams 25 may be removed so that continuous backing strips 26 and 27 may be used. As previously noted, such backing strips are not required for the beam 12a shown in FIG. 4 and, if the top plate 24 partially overlaps the side plates 22 and 23, it is not necessary to employ the diaphrams 25.

I claim as my invention:

1. A method of welding hollow elongated beams which are generally rectilinear in cross-section and having a bottom plate and a top plate spaced apart by a pair of laterally spaced side plates, all of said plates having substantially square-cut edges, comprising the steps of:

positioning the plates forming the bottom and sides of the beam in proper relation to one another with the upper surface of the bottom plate of the beams engaging and projecting outwardly from the square-cut edges of the side plates, tack welding at least one diaphragm element to the plates with the diaphragm being confined between the interior surfaces of the beam, positioning the top plate in proper location with respect to the side plates and diaphragm elements such that the two upper corners of the beam are to be welded with open corner filet welds defined by the square-cut edges thereof, tack-welding the plates together at spaced intervals along their length, securing the tack-welded beam to a welding table having means associated therewith for supporting a welding carriage relatively movable along and with respect to the length of the beam, directing welding heads mounted on the carriage at each corner of the beam, with the lower two welding heads being directed downwardly and inwardly with respect to the corners formed between the outwardly projecting bottom plate and the respective side plates, and the upper two welding heads being directed downwardly and inwardly to the respective open upper corners formed by the square-cut edges thereof, energizing the welding heads directed at each corner of the beam, and relatively moving the carriage along and with respect to the length of the beam to simultaneously and continuously weld all corners of the beam.

2. Apparatus for welding hollow elongated beams of generally rectilinear cross-section and having a bottom plate and a top plate spaced apart by a pair of laterally spaced side plates, all of said plates having substantially square-cut edges, comprising, in combination:

a long welding table for supporting the under side of the bottom plate of the beam to be welded with the side plates and top plate tack-welded thereto with the upper surface of the bottom plate of the beams engaging and projecting outwardly from the square-cut edges of the side plates and the upper corners of the beam being welded with open corner filet welds, a carriage having a plurality of adjustable welding heads thereon, one of said welding heads being directed at each corner of the beam to be welded with the lower two welding heads being directed downwardly and inwardly with respect to the corners formed between the outwardly projecting bottom plate and the respective side plates, and the upper two welding heads being directed downwardly and inwardly to the respective open upper corners formed by the square-cut edges thereof, means for supporting said carriage for relative movement along and with respect to the length of said beam, means for individually energizing and controlling each of said welding heads, and means for relatively moving said carriage along and with respect to the length of said beam to simultaneously and continuously weld all corners of the beam.

* * * * *